(12) United States Patent
Choi et al.

(10) Patent No.: US 11,880,794 B2
(45) Date of Patent: Jan. 23, 2024

(54) SMART-TAG BASED WORK PROCESSING DEVICE AND WORK PROCESSING METHOD

(71) Applicants: Delta PDS CO., LTD., Seoul (KR); Jae Ho Choi, Seoul (KR); Hyun Kyu Choi, Seoul (KR); Seo Hyun Choi, Seoul (KR)

(72) Inventors: Jae Ho Choi, Seoul (KR); Hyun Kyu Choi, Seoul (KR); Seo Hyun Choi, Seoul (KR)

(73) Assignees: Delta PDS CO., LTD., Seoul (KR); Jae Ho Choi, Seoul (KR); Hyun Kyu Choi, Seoul (KR); Seo Hyun Choi, Seoul (KR)

( * ) Notice: Subject to any disclaimer, the term of this patent is extended or adjusted under 35 U.S.C. 154(b) by 62 days.

(21) Appl. No.: 17/676,830

(22) Filed: Feb. 22, 2022

(65) Prior Publication Data

US 2023/0245026 A1  Aug. 3, 2023

(30) Foreign Application Priority Data

Jan. 28, 2022  (KR) .................... 10-2022-0013343

(51) Int. Cl.
*G06Q 10/0633* (2023.01)
(52) U.S. Cl.
CPC .................. *G06Q 10/0633* (2013.01)
(58) Field of Classification Search
CPC .......................................... G06Q 10/00–50/00
USPC ................................................ 705/7.11–7.42
See application file for complete search history.

(56) References Cited

U.S. PATENT DOCUMENTS

| 7,020,594 | B1 * | 3/2006 | Chacon | G06Q 10/04 |
| | | | | 700/100 |
| 7,076,728 | B2 * | 7/2006 | Davis | G06F 40/174 |
| | | | | 715/239 |
| 7,680,818 | B1 * | 3/2010 | Fan | G06F 16/20 |
| | | | | 707/999.103 |
| 2002/0133516 | A1 * | 9/2002 | Davis | G06F 40/174 |
| | | | | 715/239 |
| 2003/0167281 | A1 * | 9/2003 | Cohen | G06Q 10/10 |
| 2006/0053194 | A1 * | 3/2006 | Schneider | H04L 12/1827 |
| | | | | 709/204 |
| 2006/0069605 | A1 * | 3/2006 | Hatoun | G06Q 10/0633 |
| | | | | 705/7.26 |

(Continued)

FOREIGN PATENT DOCUMENTS

KR  10-2017-0040928 A  4/2017

*Primary Examiner* — Alan S Miller
(74) *Attorney, Agent, or Firm* — Revolution IP, PLLC

(57) ABSTRACT

The present disclosure relates to a smart-tag based work processing device and a work processing method, wherein the work processing device comprises a work object processing unit creating a work object that implements a work processing flow through a plurality of heterogeneous work units having a dependency relationship; a work processing flow controller creating a work unit of a first type through the work object and sequentially generating a work unit of a second type through the work unit of the first type; and a smart-tag processing unit identifying attribute information of the work unit of the second type when the corresponding work unit is created, automatically generating a smart-tag based on the attribute information, and combining the smart-tag into the work unit of the first type.

16 Claims, 9 Drawing Sheets

(56) References Cited

U.S. PATENT DOCUMENTS

| | | | |
|---|---|---|---|
| 2007/0016557 A1* | 1/2007 | Moore | G06Q 10/10 |
| 2008/0183733 A1* | 7/2008 | Jackson | G06Q 10/06 |
| 2013/0283296 A1* | 10/2013 | Brown | G06F 11/3466 |
| | | | 719/318 |
| 2015/0286636 A1* | 10/2015 | Elkhou | G06Q 50/18 |
| | | | 707/722 |
| 2017/0041452 A1* | 2/2017 | Amann | H04W 4/70 |
| 2021/0081366 A1* | 3/2021 | Madisetti | G06F 40/289 |

\* cited by examiner

SMART-TAG BASED WORK PROCESSING DEVICE AND WORK PROCESSING METHOD

TECHNICAL FIELD

The present disclosure relates to a technology of work processing and management and more particularly, to a method for effectively supporting work participants to process work smoothly by providing an efficient search function between objects under PCDA structure through smart-tags with a search condition.

BACKGROUND

In general, an Internet messenger corresponds to an application that delivers a message including text or graphics between users and may be implemented in the form of chat rooms in which a plurality of users participate. In one embodiment, the Internet messenger may include a mobile messenger performed in a mobile environment (for example, a mobile phone), including KakaoTalk, Line, WeChat, and Facebook messenger. The Internet messengers are used increasingly in various work management and processing cases.

Kanban board is one of the tools that may be used to implement kanban for managing work at a personal or organizational level. Also, the kanban board visualizes stages of work and sub-tasks of each work stage by listing them on a plane. The kanban board lists individual stages over the overall process of higher-level work in one direction and uses cards to represent work items. The cards used in the kanban board may be referred to as kanban cards. For example, the kanban cards may show the progress of work by moving the kanban cards from left to right according to the work stages.

Here, kanban is one of the software development processes, and it is a concept originating from a development method to release products on time without overloading developers.

PRIOR ART

Patent Literature

Korean Patent No. 10-2017-0040928 (Apr. 14, 2017)

SUMMARY

An embodiment of the present disclosure is intended to provide a smart-tag based work processing device and work processing method that may improve work efficiency by enabling work participants to easily recognize a workflow in a communication process between the work participants by providing an efficient automatic tag attachment and search function for different types of work units through smart-tags with a search condition according to the work progress stages of the entire project having a PDCA structure.

Among embodiments, a smart-tag based work processing device comprises a work object processing unit creating a work object that implements a work processing flow through a plurality of heterogeneous work units having a dependency relationship; a work processing flow controller creating a work unit of the first type through the work object and sequentially creating a work unit of the second type through the work unit of the first type; and a smart-tag processing unit identifying attribute information of the work unit of the second type when the corresponding work unit is created, automatically generating a smart-tag based on the attribute information, and combining the smart-tag into the work unit of the first type.

The work object processing unit may implement a Plan Do Check Act (PDCA) work processing flow using work projects, work notes, work chat rooms, and work tasks.

The work processing flow controller may control the dependency relationship by including the work unit of the second type in the work unit of the first type.

The smart-tag processing unit may determine, as the attribute information, at least one combination of a creator, creation time, and a state value related to the corresponding work unit; and the type of the corresponding work unit.

The smart-tag processing unit may generate the smart-tag based on the identification code of a work organization to which the creator belongs.

When generating the smart-tag based on the creation time, the smart-tag processing unit may update and display the smart-tag according to the elapsed time from the creation time.

The smart-tag processing unit may generate the smart-tag separately according to the state value and update and display the smart-tag according to the state value change.

The smart-tag processing unit may determine a work progress stage change or a work deadline change as the state value change when the corresponding work unit is a work task.

The smart-tag processing unit may generate the smart-tag separately according to whether the corresponding work unit is a reminder and update and display the smart-tag according to the state value change.

The smart-tag processing unit may extend the smart-tag by setting a search condition and searching for the work unit of the second type.

The smart-tag processing unit may update the extension of the smart-tag by detecting a change in the work unit of the second type.

The smart-tag processing unit may configure the search condition using a search keyword and a search operator and set user's access rights to the extension part of the smart-tag.

When the user's access rights are set in the extension part of the smart-tag, the smart-tag processing unit may hide the corresponding tag name of the work unit of the first type from a user without the access rights.

The smart-tag processing unit may include other smart-tags that do not establish a mutual inclusion relationship in the smart-tag.

When a search through the smart-tag is performed, the smart-tag processing unit may detect a change in the work unit of the second type and notify of the change through a smart-tag in the work unit of the first type.

When a search through the smart-tag is performed, the smart-tag processing unit may detect a change in the work unit of the second type and highlight and display the corresponding smart-tag in the work unit of the first type.

Among embodiments, a smart-tag based work processing method comprises processing a work object creating a work object that implements a work processing flow through a plurality of heterogeneous work units having a dependency relationship; controlling a work processing flow creating a work unit of the first type through the work object and sequentially creating a work unit of the second type through the work unit of the first type; and processing a smart-tag identifying attribute information of the work unit of the second type when the corresponding work unit is created, automatically generating a smart-tag based on the attribute information, and combining the smart-tag into the work unit of the first type.

The present disclosure may provide the following effects. However, since it is not meant that a specific embodiment has to provide all of or only the following effects, the technical scope of the present disclosure should not be regarded as being limited by the specific embodiment.

One embodiment of the present disclosure may provide an efficient automatic tag attachment and search function for different types of work units through smart-tags with a search condition according to work progress stages of the entire project having a PDCA structure.

In particular, through the process above, the present disclosure may support work participants to process work smoothly by enabling the work participants to easily recognize a workflow in a communication process between the work participants, thereby improving work efficiency.

DESCRIPTION OF EXEMPLARY EMBODIMENTS

Figure 1:
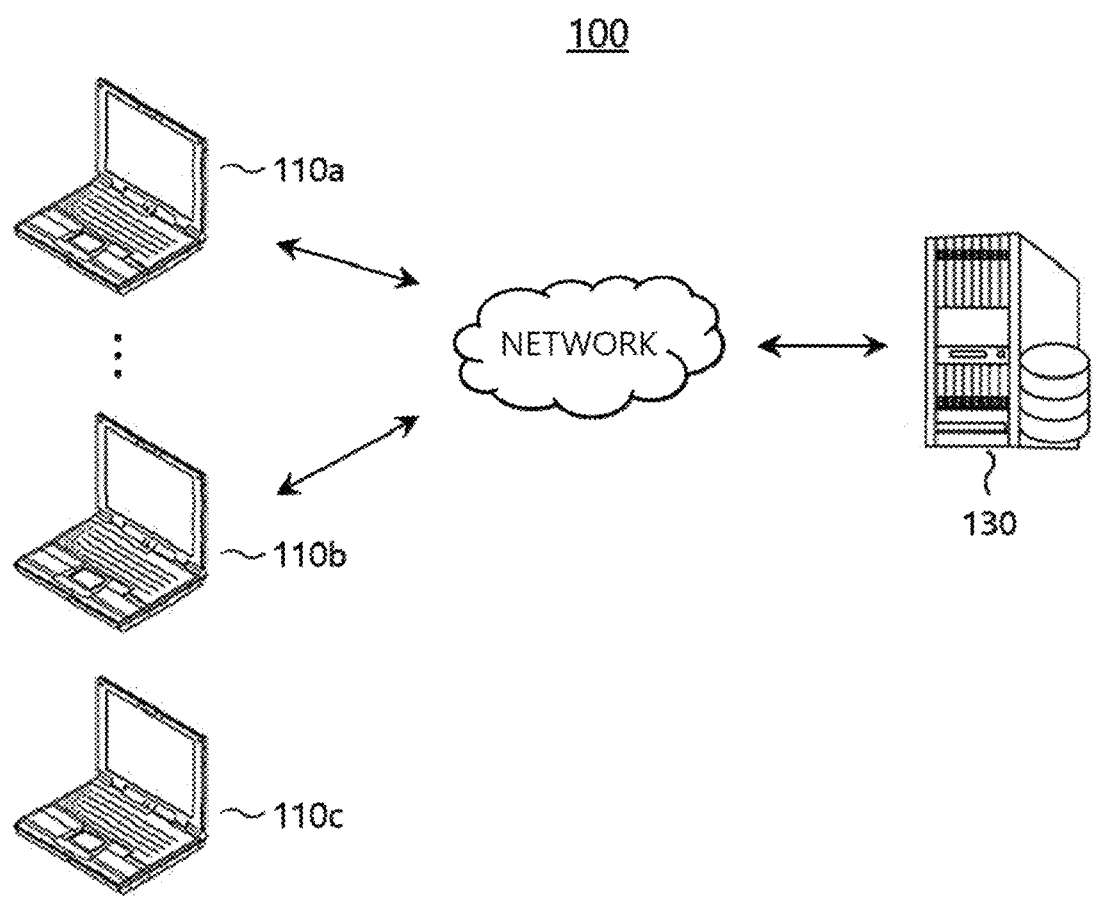
FIG. 1 illustrates a work processing system according to the present disclosure.

Since the description of the present disclosure is merely an embodiment for structural or functional explanation, the scope of the present disclosure should not be construed as being limited by the embodiments described in the text. That is, since the embodiments may be variously modified and may have various forms, the scope of the present disclosure should be construed as including equivalents capable of realizing the technical idea. In addition, a specific embodiment is not construed as including all the objects or effects presented in the present disclosure or only the effects, and therefore the scope of the present disclosure should not be understood as being limited thereto.

On the other hand, the meaning of the terms described in the present application should be understood as follows.

Terms such as "first" and "second" are intended to distinguish one component from another component, and the scope of the present disclosure should not be limited by these terms. For example, a first component may be named a second component and the second component may also be similarly named the first component.

It is to be understood that when one element is referred to as being "connected to" another element, it may be connected directly to or coupled directly to another element or be connected to another element, having the other element intervening therebetween. On the other hand, it is to be understood that when one element is referred to as being "connected directly to" another element, it may be connected to or coupled to another element without the other element intervening therebetween. Meanwhile, other expressions describing a relationship between components, that is, "between," "directly between," "neighboring to," "directly neighboring to," and the like, should be similarly interpreted.

It should be understood that the singular expression includes the plural expression unless the context clearly indicates otherwise, and it will be further understood that the terms "comprises" or "have" used in this specification, specify the presence of stated features, numerals, steps, operations, components, parts, or a combination thereof, but do not preclude the presence or addition of one or more other features, numerals, steps, operations, components, parts, or a combination thereof.

Identification symbols (for example, a, b, and c) for individual steps are used for the convenience of description. The identification symbols are not intended to describe an operation order of the steps. Therefore, unless otherwise explicitly indicated in the context of the description, the steps may be executed differently from the stated order. In other words, the respective steps may be performed in the same order as stated in the description, actually performed simultaneously, or performed in reverse order.

The present disclosure may be implemented in the form of program code in a computer-readable recording medium. A computer-readable recording medium includes all kinds of recording devices storing data that a computer system may read. Examples of a computer-readable recording medium include a ROM, a RAM, a CD-ROM, a magnetic tape, a floppy disk, and an optical data storage device. Also, the computer-readable recording medium may be distributed over computer systems connected through a network so that computer-readable code may be stored and executed in a distributed manner.

Unless defined otherwise, all the terms used in the present disclosure provide the same meaning as understood generally by those skilled in the art to which the present disclosure belongs. Those terms defined in ordinary dictionaries should be interpreted to have the same meaning as conveyed in the context of related technology. Unless otherwise defined explicitly in the present disclosure, those terms should not be interpreted to have ideal or excessively formal meaning.

FIG. 1 illustrates a work processing system according to the present disclosure.

Referring to FIG. 1, the work processing system 100 may include a plurality of user terminals 110 and a work processing device 130.

A plurality of users in the embodiment of the present disclosure may belong to one or more user groups. One or more user groups may be referred to as a first user group, a second user group, and so on. Also, one user may belong to one or more user groups.

A first user terminal 110a may correspond to a terminal of a first user, a second user terminal 110b may correspond to a terminal of a second user, and a third user terminal 110c may correspond to a terminal of a third user.

Here, the first to third user may participate in one or more work projects together as work participants. For the works performed through one work project, one or more users among the first to third users may be a work creator or a work manager, and another one or more users may be a work processor. Also, a work participant other than the work creator or work manager and work processor may be classified as a work-related person.

The entire project may include the first to third users and include a plurality of work projects performed independently. Also, work notes may be recorded and stored in each work project according to work progress stages, and a work chat room in which work participants related to the corresponding work participate may be created in the work note. Work participants may have a work-related conversation through the work chat room and create and share work tasks as needed.

At this time, a work processing flow performed over the entire project may be implemented through work objects and may be defined as a work processing flow between different types of work units. In particular, a mutually dependent connection relationship may be formed between a plurality of different types of work units. Here, different types of work units (or heterogeneous work units) may include a work project, a work note, a work chat room, and a work task.

For example, when a work object implementing a work processing flow is created, a work unit of the first type may be created within the work object. Afterward, a work unit of the second type may be sequentially created through the work unit of the first type. In one work project, a plurality of work notes may be created for each work progress stage, a work chat room in which work-related persons participate may be created in the work note, and at least one work task may be created through the work chat room.

As a result, it is possible to implement a Plan Do Check Act (PDCA) work processing flow using work projects, work notes, work chat rooms, and work tasks. For example, a work progress stage may be classified into "in progress," "in review," "under improvement," and "improvement done" according to the PDCA cycle. In other words, the PDCA cycle may correspond to a systematic and efficient work management technique to increase work performance and outputs.

More specifically, P may correspond to the establishment of a plan, namely, the creation of a work project. In the plan phase, by setting a goal to be achieved, a specific strategy and an action plan for realizing the goal may be created in relation to the work project. Also, D may correspond to the do phase, namely, recording of work notes. In the do phase, work notes may be created and recorded in relation to the work to be actually processed according to regulations, guidelines, and standards based on the established plan.

And C may correspond to the check phase, namely, operating a work chat room. The check phase may provide a means for checking, analyzing, and evaluating the results of created work. Also, A may correspond to the act phase, namely, the processing of a work task. In the act phase, detailed issues may be handled to improve and supplement work, such as adjusting existing work results or supplementing work items by reflecting problems and opportunities for improvement identified through communication.

If a work project is created within the entire project, the work progress stage of the corresponding work project may be "in progress." Also, if the work is processed as the work progresses and work notes are recorded, the work progress stage may be changed to "in review." Also, if a work manager checks the processing results of the work "in review" and terminates the work, the work progress stage may become "completed." On the other hand, after checking the work processing results, the work manager may create a predetermined work task and request improvement of the work; in this case, the work progress stage may become "under improvement."

When a work processor updates the work task by improving the work processing results according to the work improvement request, the work manager may check the work improvement results. In this case, the work progress stage may become "improvement done." Meanwhile, work projects may be classified and managed according to individual work progress stages within the entire project.

The work processing device 130 may correspond to a computing device connected to at least one user terminal 110 through a network. In one embodiment, the work processing device 130 may manage at least one or more user groups that include another user related to one user as a member, namely, a work participant.

In one embodiment, the work processing device 130 may be connected to the user terminal 110 through a dedicated agent installed in the user terminal 110. Here, the dedicated agent may correspond to an agent program software, which, once installed in the user terminal 110, enables the user terminal 110 and the work processing device 130 to operate in conjunction with each other under the approval of the user terminal 110.

The user terminal 110 may correspond to a computing device connected to the work processing device 130 through a network, which may be a terminal implemented in the form of a desktop computer, a notebook computer, a tablet PC, or a smartphone.

In one embodiment, at least one of the user terminals 110 may be a mobile terminal and may be connected to the work processing device 130 through cellular communication or Wi-Fi communication. In another embodiment, at least one of the user terminals 110 may be a desktop computer and may be connected to the work processing device 130 through the Internet.

Figure 2:
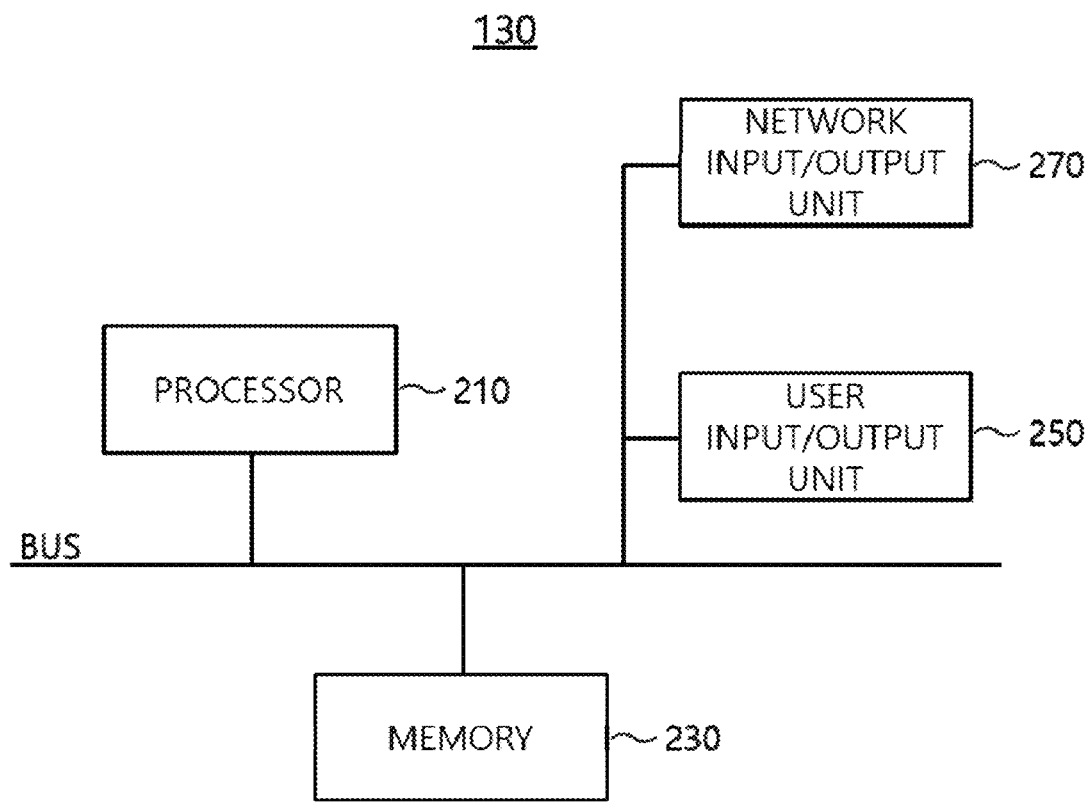
FIG. 2 illustrates a system structure of the work processing device of FIG. 1.

FIG. 2 illustrates a system structure of the work processing device of FIG. 1.

Referring to FIG. 2, the work processing device 130 may include a processor 210, a memory 230, a user input/output unit 250, and a network input/output unit 270.

The processor 210 may execute a work processing procedure according to an embodiment of the present disclosure, manage the memory 230 read or written during the procedure, and schedule synchronization time between volatile and non-volatile memories in the memory 230.

The processor 210 may control the overall operation of the work processing device 130. By being electrically connected to the memory 230, the user input/output unit 250, and the network input/output unit 270, the processor 210 may control the data flow between them. The processor 210 may be implemented as a central processing unit (CPU) of the work processing unit 130. A more specific operation of the processor 210 will be described in detail later with reference to FIG. 3.

The memory 230 may include an auxiliary storage device implemented using non-volatile memories such as Solid State Disk (SSD) or Hard Disk Drive (HDD) used to store all of the data required for the work processing device 120 and a main storage device implemented using volatile memories such as Random Access Memory (RAM). As described above, the memory 230 may be implemented using volatile and non-volatile memories. If implemented using non-volatile memories, the memory 230 may be implemented to be connected through a hyperlink.

The user input/output unit 250 includes an environment for receiving a user input and an environment for outputting specific information to the user. For example, the user input/output unit 250 may include an input device including an adaptor such as a mouse, a trackball, a graphic tablet, a scanner, a touchscreen, a keyboard, or a pointing device or connected to the adaptor; and an output device including an adaptor such as a monitor or a touchscreen. In one embodiment, the user input/output unit 250 may correspond to a computing device connected through remote access. In this case, the work processing device 130 may serve as a server.

The network input/output unit 270 may include an environment for connecting to the user terminal 120 through a network and, for example, may include an adaptor for Local Area Network (LAN) communication.

Figure 3:
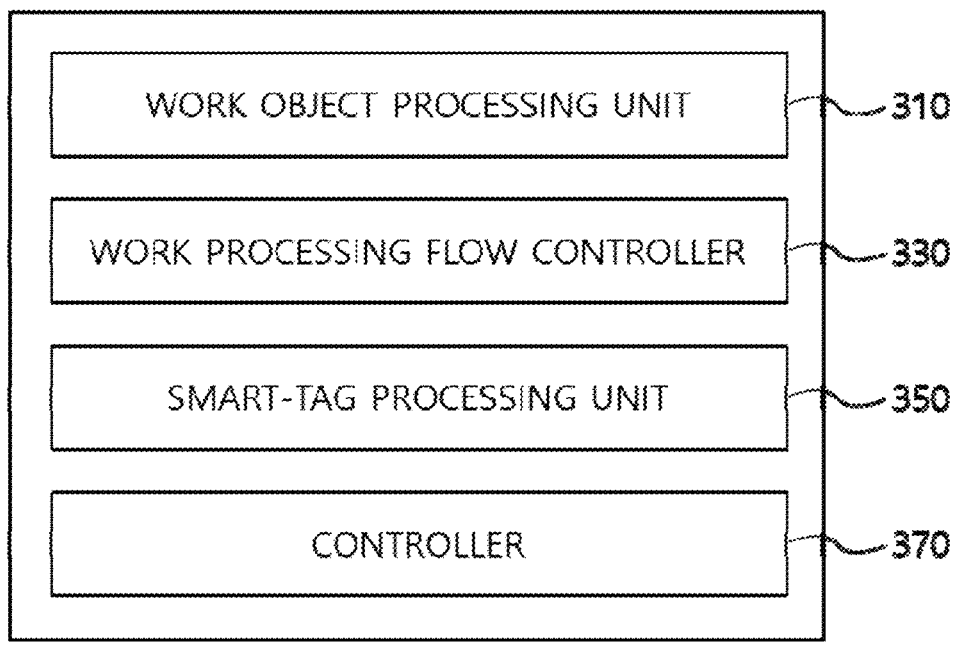
FIG. 3 illustrates a functional structure of the work processing device of FIG. 1.

FIG. 3 illustrates a functional structure of the work processing device of FIG. 1.

Referring to FIG. 3, the work processing device 130 may include a work object processing unit 310, a work processing flow controller 330, and a smart-tag processing unit 350, and a controller 370.

However, it should be noted that the work processing device 130 according to an embodiment of the present disclosure does not necessarily have to include all of the functional components simultaneously. Rather, part of the functional components may be omitted depending on the respective embodiments, or part or all of the functional components may be included selectively.

First, the work processing device 130 may create at least one work project managed and progressed independently within the entire project. In this case, each work project may be managed according to a separate work progress stage, and the entire project may be implemented to integrate and manage the work progress stages of individual work projects.

Also, the work processing device 130 may receive user information on one or more users from the user terminal 110 through the user input/output unit 250 and may store, manage, and update the user information of the users participating in the entire project and the respective work projects. The work processing device 130 may use the collected user information in the subsequent creation and processing stages of work projects, work notes, work chat rooms, and work tasks.

For example, the work processing device 130 may create a user group consisting of a plurality of users to create a work chat room associated with a specific work note and may store and manage information on the name or members of each user group, identification information of a work chat room matching the user group, and information related to the management of rights of users and user groups.

In one embodiment, the work processing device 130 may provide a user interface for receiving a user signal related to a work project or work to the user terminal 110. The work processing device 130 may receive a user signal that includes at least one or more of a request signal for project creation or signals related to information inputting and deadline setting that are input from the user terminal 110 through the user interface.

When there are one or more work projects, work notes, work chat rooms, and work tasks, the work processing device 130 may generate a list of related objects and provide the generated list to the user terminal 110 to manage the entire project. And when providing a related list, the work processing device 130 may also provide an access path for the corresponding object as hyperlink information. In other words, when a user accesses a work project, a work note, a work chat room, and a work task, the user may effectively process access to the related object using the access path provided together.

Also, the description of the operations of the work processing device 130 may be equally applied to other components, that is, the work object processing unit 310, the work processing flow control unit 330, and the smart-tag processing unit 350. In what follows, repeated descriptions will be omitted.

The work object processing unit 310 may create a work object that implements a work processing flow through a plurality of heterogeneous work units having a dependency relationship. Here, the work object may be created by including various work units created and processed in relation to work within the entire project and may be implemented to provide various management functions for work management. For example, a work object may be created in response to a work project and realize a work processing flow corresponding to work progress within the work project. In other words, the work processing flow may be formed through a connection relationship between various work units created according to the work progress within a work object.

Meanwhile, a work unit may correspond to a unit object according to the work progress stage and may be created in response to a work project, a work note, a work chat room, and a work task. Work units may be classified into different types according to work projects, work notes, work chat rooms, and work tasks; and may be processed and managed according to the respective types. Also, the work processing device 130 may create and provide a dedicated container to manage the work units according to their type. In other words, the work units of the same type may be managed by being inserted into the same dedicated container and moved between dedicated containers through interconnected link information.

In one embodiment, the work object processing unit 310 may implement a Plan Do Check Act (PDCA) work processing flow using a work project, a work note, a work chat room, and a work task. A work project may be created in response to the plan (P) of the PDCA work processing flow, a work note may correspond to the do (D) phase, a work chat room may correspond to the check (C) phase, and a work task may correspond to the act (A) phase. The work object processing unit 310 may process the start operation of a work processing flow according to the creation of a work project within the entire project and implement the work processing flow responding to the work project by defining a precedence relationship of individual works based on the work notes within the work project and the creation time of work chat rooms and work tasks.

Also, a work processing flow may set a work deadline based on the deadline of a work project, and the work deadline may be updated dynamically according to the change of the deadline of a work task on the work processing flow.

The work processing flow controller 330 may create a work unit of the first type through a work object and sequentially create a work unit of the second type through the work unit of the first type. A work processing flow may be implemented through a connection relationship between work units, and the work processing flow controller 330 may perform the operation for control of the work processing flow by defining a connection relationship between work units in the progress of sequentially creating different types of work units and creating link information between the work units.

On the other hand, priorities for creation may be set among work units, and a dependency relationship may be formed according to the priorities. For example, within the entire project, a work project may be created with the highest priority, and after the creation of the work project, one of a work note, a work chat room, and a work task may be created with a lower priority. Also, after the creation of a work note, one of the work chat room and the work task may be created with a lower priority. Also, after the creation of a work chat room, a work task may be created with a lower priority. Accordingly, a work unit created with a lower priority may be dependent on a work unit created with a higher priority.

In one embodiment, the work processing flow controller 330 may control the dependency relationship by including a work unit of the second type in a work unit of the first type. For example, when a work project is created as a work unit of the first type, a work note is created as a work unit of the second type and included in the work project, thereby forming a mutual dependency relationship. In other words, a work note may be dependent on a work project. Also, when a work note is created as a work unit of the first type, a work chat room is created as a work unit of the second type and included in the work note, thereby forming a mutual dependency relationship. In other words, a work chat room may be dependent on a work note.

At this time, the dependency relationship may be chained, and in the example above, when a work note is included in a work project, and a work chat room is included in the work note, a mutual dependency relationship may be formed between the work project and the work chat room. In other words, the work chat room may be dependent on the work note and the work project, respectively. The work processing flow controller 330 may dynamically control the work processing flow by forming or selectively removing a dependency relationship between work units.

When a work unit of the second type is created, the smart-tag processing unit 350 may identify attribute information of the corresponding work unit, automatically create a smart-tag based on the attribute information, and combine the smart-tag to a work unit of the first type. Here, the attribute information of the work unit may include information on a creator who creates the work unit, information on the time the work unit is created, state value information of the work unit, and type information of the work unit. Here, the smart-tag may correspond to a tag attached to various work units created during the entire project's progress.

At this time, a dependency relationship may be formed between the work unit of the first type and the work unit of the second type. In other words, when the creation of a work unit is detected and there exists a work unit of a higher-level type on which the created work unit depends, the smart-tag processing unit 350 may generate a smart-tag using various types of attribute information of the created work unit and attach the generated smart-tag to the work unit of the higher-level type.

For example, within a specific work project, if a work note at the work progress stage of "in progress" is created by user A around 09:00 AM, the smart-tag associated with the name of user A, a smart-tag associated with 09:00 AM, a smart-tag associated with "in progress," or a smart-tag associated with the work note may be generated and attached to a specific work project. In this case, the smart-tag may be implemented in an identifiable form according to the associated attribute information, the work unit to which the smart-tag is attached may be easily found through the corresponding smart-tag, and furthermore, the associated attribute information may be indirectly expressed according to the type of the smart-tag.

Also, the smart-tag processing unit 350 may independently set a smart-tag generation rule for each work project. The smart-tag generation rule may be defined using the attribute information of a work unit used to generate the smart-tag. For example, when the generation rule is defined to generate a smart-tag according to the creation time of the attribute information of a work unit, the smart-tag processing unit 350 may generate a smart-tag using the creation time of the work unit. Also, the smart-tag generation rule may be defined using a single attribute or a combination of multiple attributes. As a result, smart-tags generated according to a specific generation rule may be expressed in as many different forms as the number of attribute values of the corresponding attribute information.

In one embodiment, the smart-tag processing unit 350 may determine at least one combination of a creator and creation time, a state value, and the type of a work unit as the attribute information of the work unit. In other words, the smart-tag processing unit 350 may generate a smart-tag using not only one attribute but also a combination of a plurality of attributes as the attribute information of the work unit. For example, the smart-tag processing unit 350 may generate a smart-tag by identifying the creator and creation time of the work unit from the attribute information. Also, the smart-tag processing unit 350 may generate a smart-tag by identifying the type and state value of the work unit from the attribute information.

In one embodiment, the smart-tag processing unit 350 may generate a smart-tag based on the identification code of a work organization to which the creator of the work unit belongs. For example, when a work manager x belonging to development team A within a specific work project creates a work note, the smart-tag processing unit 350 may generate a smart-tag based on the identification code of development team A and attaches the generated smart-tag to the specific work project. In this case, work participants may access the work note through the smart-tag and recognize the work organization to which the creator of the work note belongs through the form of the smart-tag.

In one embodiment, the smart-tag processing unit 350 may generate a smart-tag based on the creation time of a work unit. For example, if creator x creates a work note around 02:00 PM in a specific work project, the smart-tag processing unit 350 may generate a smart-tag according to the creation time of 02:00 PM and attach the generated smart-tag to the specific work project.

Also, the smart-tag processing unit 350 may update and display the smart-tag generated according to the elapsed time from the corresponding generation time based on the generation time of the smart-tag. In the example above, the smart-tag processing unit 350 may update and display the color or size of the smart-tag according to the elapsed time from 02:00 pm. Accordingly, the smart-tag may change its color or display a larger and larger size each time the elapsed time increases by one hour.

In one embodiment, the smart-tag processing unit 350 may generate a smart-tag based on the state value of a work unit. At this time, the state value may correspond to a work progress stage or a work deadline. For example, when the work unit is a work task, a smart-tag may be generated in a different form for each work progress stage of "new," "in progress," "finished," and "in review." Alternatively, a smart-tag may be generated in a different form according to whether a work deadline is imminent or in transition.

Also, the smart-tag processing unit 350 may update and display a smart-tag when the state value of a work unit is changed. For example, the smart-tag processing unit 350 may change the color or shape of the smart-tag according to a change in the work progress stage or a change in the state of the work deadline. In other words, when the work unit is a work task, the smart-tag processing unit 350 may determine the change of the work progress stage or the change of the work deadline as a change in the state value.

In one embodiment, the smart-tag processing unit 350 may generate a smart-tag separately according to whether the corresponding work unit is a reminder and update and display the smart-tag according to a change in the state value. In other words, the smart-tag generation rule may be defined by setting whether the work unit is a reminder as the attribute information. For example, when the work unit is a work task, the smart-tag processing unit 350 may generate a smart-tag separately according to whether the work unit is a reminder or the number of reminders. In other words, when the work unit is a work task, the smart-tag processing unit 350 may determine a change in whether the work unit is a reminder or a change in the number of reminders as a change in the state value.

In one embodiment, the smart-tag processing unit 350 may extend the smart-tag by setting a search condition and searching for the work unit of the second type. At this time, the extension of the smart-tag may be implemented as an automatic attachment function of the smart-tag. More specifically, a smart-tag may be generated by including a tag name and a tag condition. Here, the tag name may correspond to the name of the smart-tag, and the tag condition may correspond to a search condition of the smart-tag. In other words, the smart-tag may be defined by including a tag name and a tag condition, and the tag name and the tag condition may be selectively used in a search process for the smart-tag.

For example, when a smart-tag is first generated according to the creation of a work unit, the smart-tag may have a tag name generated based on the attribute information of the work unit, such as the name of a creator, the name of a time section to which the creation time belongs, and the state name of the state value. Thereafter, a tag condition may be added to the smart-tag by the user, and the smart-tag processing unit 350 may set a search condition for the work unit as the tag condition and add the set search condition to the smart-tag. At this time, the smart-tag processing unit 350 may start a search operation for a smart-tag updated due to the addition of the search condition and automatically attach the corresponding smart-tag to the work units satisfying the search condition as the search for the corresponding smart-tag progresses. If the same smart-tag has already been attached to a searched work unit, an operation for updating the corresponding smart-tag may be performed; otherwise, the corresponding smart-tag may be additionally attached thereto.

In one embodiment, the smart-tag processing unit 350 may update the smart-tag extension by detecting a change in a work unit of the second type. According to the smart-tag extension, the same smart-tag may be attached simultaneously to a plurality of work units satisfying the search condition of the smart-tag. When a change occurs due to modification or editing of a work unit, the smart-tag processing unit 350 may remove smart-tags that do not satisfy the search condition among the smart-tags attached to the work unit. At the same time, among other smart-tags not attached to the work unit, smart-tags that satisfy the search condition may be attached to the work unit.

In one embodiment, the smart-tag processing unit 350 may configure a search condition using a search keyword and a search operator and may set the access rights of the user to the extension part of a smart-tag. A smart-tag may be extended by adding a search condition, and the added search condition may correspond to the extension part of the smart-tag. In other words, predetermined access rights may be set for each search condition added by the extension part of the smart-tag. For example, when search condition 2 is added to smart-tag #A having search condition 1, search condition 2 may correspond to the extension part of smart-tag #A. The smart-tag processing unit 350 may set access rights independently for each extension part of the smart-tag. When user x has access rights for search condition 2 of smart-tag #A, user x may select #A to start a search based on the search condition 2. On the other hand, if user x does not have access rights to search condition 2, a search based on the search condition 2 may not be initiated even if user x selects #A.

In one embodiment, when the user's access rights are set in the extension part of the smart-tag, the smart-tag processing unit 350 may hide the corresponding tag name of a work unit of the first type from a user without the access rights. When a user accesses a work unit to which a smart-tag is attached, the tag name may be exposed to the user. However, when predetermined access rights are set in the smart-tag, the tag name may be exposed only to users with the corresponding access rights.

Also, when a smart-tag includes an extension part, individual access rights may be set for each extension part. When a work unit to which the corresponding smart-tag is attached is exposed to a user without access rights to a specific extension part, the corresponding smart-tag may be exposed limitedly. Accordingly, the corresponding user may not be able to perform a search through the extension part of the corresponding smart-tag.

In one embodiment, the smart-tag processing unit 350 may include, in a smart-tag, other smart-tags that do not establish a mutual inclusion relationship with the smart-tag. In other words, other smart-tags may be included in a tag condition of the smart-tag. For example, when smart-tag #B is included in a search condition of smart-tag #A, the user may select #A and start a search using the search condition of #A, and search results may contain a search result related to smart-tag #B. On the other hand, when a second smart-tag is included in the search condition of a first smart-tag and the first smart-tag is included in the search condition of the second smart-tag, a mutual inclusion relationship may be established between the first and second smart-tags. The smart-tag processing unit 350 may prevent a search operation from being cyclically performed according to the mutual inclusion relationship by including only the other smart-tags that do not establish a mutual inclusion relationship with the smart-tag as a search condition.

In one embodiment, when a search is performed through smart-tags, the smart-tag processing unit 350 may detect a change in a work unit of the second type and notify of the change through a smart-tag in a work unit of the first type. Specifically, when the user initiates a search operation through smart-tags, a change in a work unit of the second type associated with the corresponding smart-tag may be detected while searching for work units of the first type associated with the corresponding smart-tag is performed. At this time, a change in a work unit may be limited to a recent time range, and the time range may be utilized by being set in advance. When there exists a work unit of the second type and a change in the work unit is detected according to a search through smart-tags, the smart-tag processing unit 350 may notify the user of the search result by visualizing smart-tags for work units of the first type on which work units of the second type are dependent.

For example, when the user searches for a work project through smart-tags, the smart-tag processing unit 350 may detect work notes that have been changed recently from among work notes related to the smart-tags and may display the smart-tags associated with the corresponding work notes from the searched work project by highlighting the smart-tags. Accordingly, the user may check the work project including the highlighted smart-tags on a search result screen and may indirectly recognize the existence of recently changed work notes among the work notes in the work project. Meanwhile, the highlighting operation may correspond to an operation that emphasizes at least one of shape and color among various methods for visualizing a smart-tag.

The controller 370 may control the overall operation of the work processing device 130 and manage a control flow or a data flow among the work object processing unit 310, the work processing flow controller 330, and the smart-tag processing unit 350.

Figure 4:
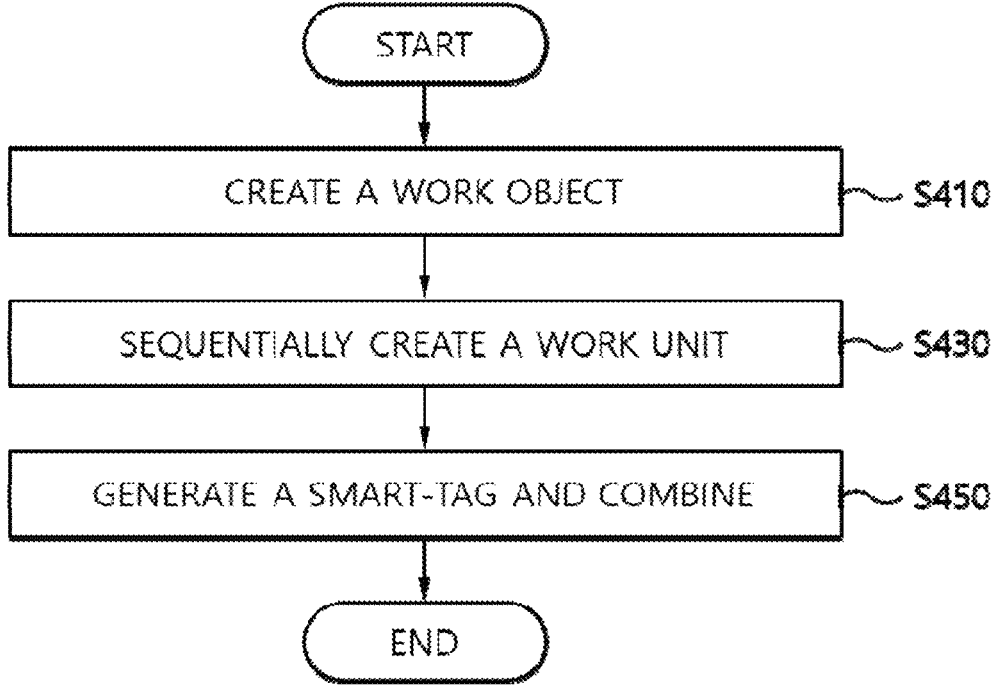
FIG. 4 is a flow diagram illustrating a smart-tag based work processing method according to the present disclosure.

FIG. 4 is a flow diagram illustrating a smart-tag based work processing method according to the present disclosure.

Referring to FIG. 4, the work processing device 130 may create a work object implementing a work processing flow through a plurality of heterogeneous work units having a dependency relationship through the work object processing unit 310 (S410).

The work processing device 130 may create a work unit of the first type through a work object by using the work processing flow controller 330 and sequentially create a work unit of the second type through the work unit of the first type (S430).

When a work unit of the second type is created through the smart-tag processing unit 350, the work processing device 130 may identify the attribute information of the corresponding work unit, automatically create a smart-tag based on the attribute information, and combine the smart-tag into the work unit of the first type (S450).

On the other hand, smart-tags may provide an efficient search for work units. In other words, a user may obtain a search result for the work units associated with the corresponding smart-tags by clicking the smart-tags displayed on the work units or by directly entering a tag name or a search condition. At this time, the search result may include a list of work units to which the corresponding smart-tags are attached or a list of work units connected to the corresponding smart-tags.

In one embodiment, the work processing device 130 may generate a search result according to direct linkage to a smart-tag. For example, when work notes are searched by calling a smart-tag with a tag name of "abc," all of the work notes to which the smart-tag having a tag name "abc" is attached may be searched, and the searched work notes may form a single connection relationship with the smart-tag having a tag name of "abc".

In one embodiment, the work processing device 130 may generate a search result according to indirect linkage to a smart-tag. Here, the indirect linkage of a smart-tag may correspond to a multiple linkage relationship.

For example, when a smart-tag with a tag name of "def" is called as a search condition, work notes with a smart-tag having a tag name of "def" may be searched first, and then a work project, a work chat room, or a work task related to the corresponding work note may be searched together. In other words, the searched work project, work chat room, or work task does not form a direct connection relationship with a smart-tag having the tag name "def" but may form an indirect connection relationship with a smart-tag having the tag name "def" as a result of being connected to the work note.

In one embodiment, the work processing device 130 may generate a search result by setting the length of indirect linkage for a smart-tag. Here, the linkage length may correspond to the number of connections made indirectly. For example, when the linkage length is set to 2, the work processing device 130 may first search for a work note matching the tag name of a smart-tag and then perform a second search for work units of a different type connected to the work note found from the first search. At this time, the second search result is due to the indirect linkage, and the linkage length may be 1. Afterward, the work processing device 130 may search for work units of a different type connected to the work units found from the second search, and the length of the indirect linkage may be 2.

Figure 5:
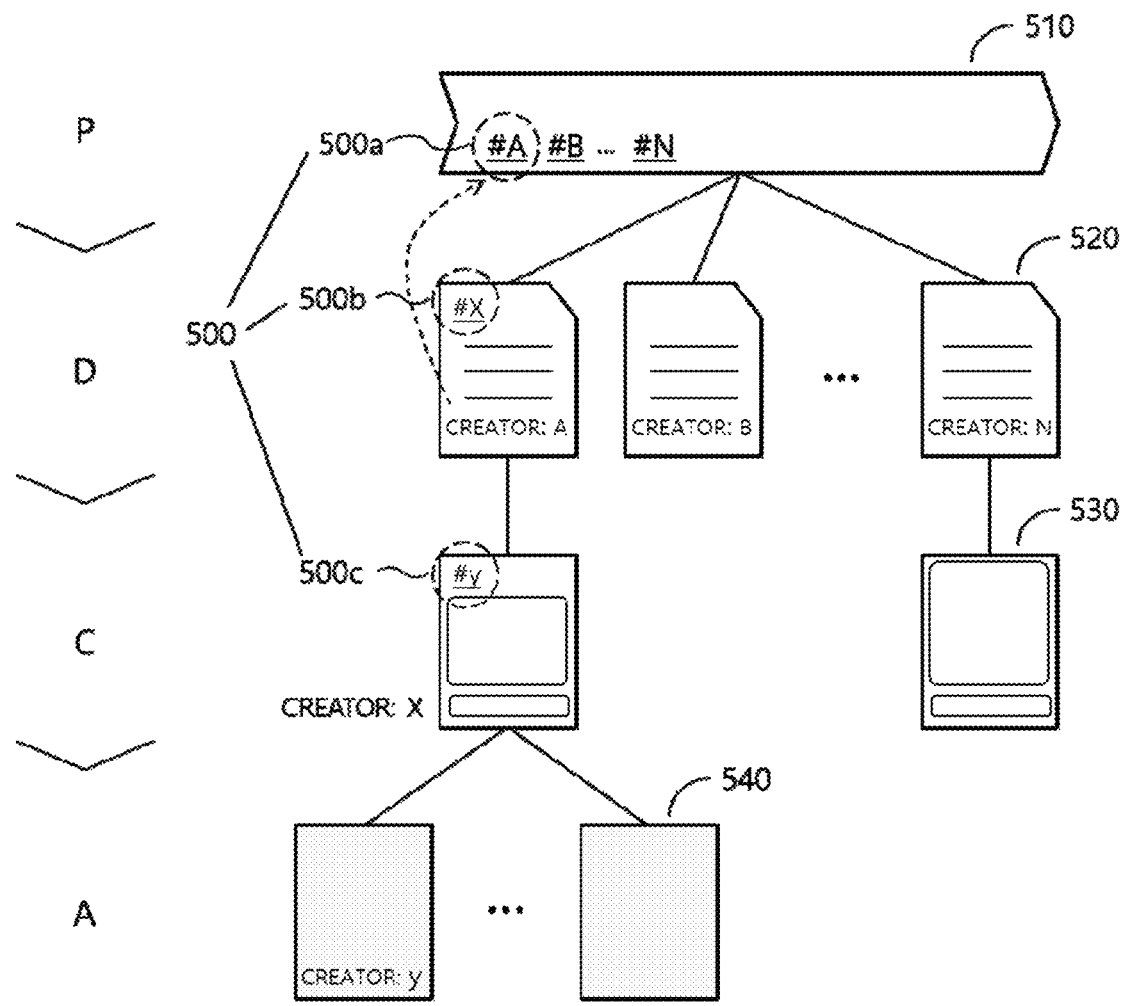
FIGS. 5 to 7 illustrate a smart-tag operating in the PDCA structure according to the present disclosure.
Figure 6:
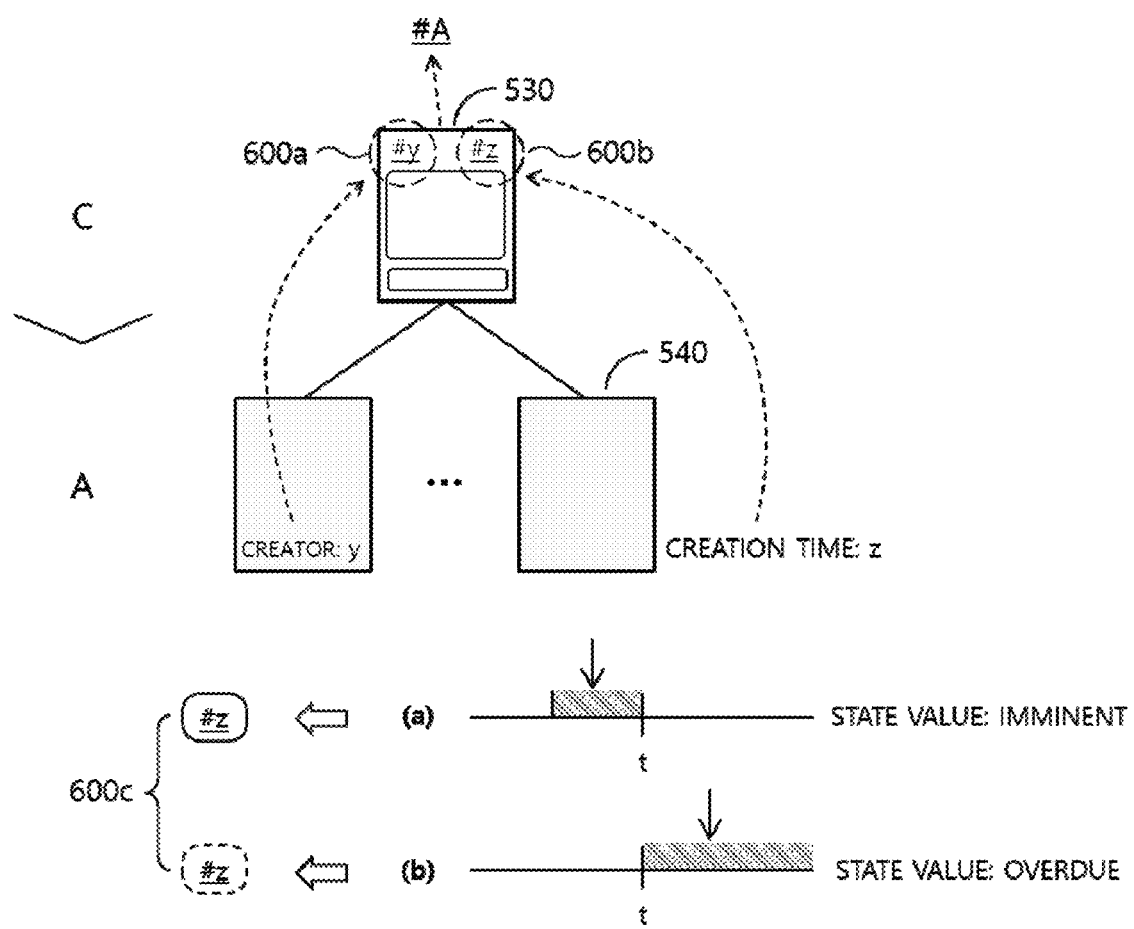
Figure 7:
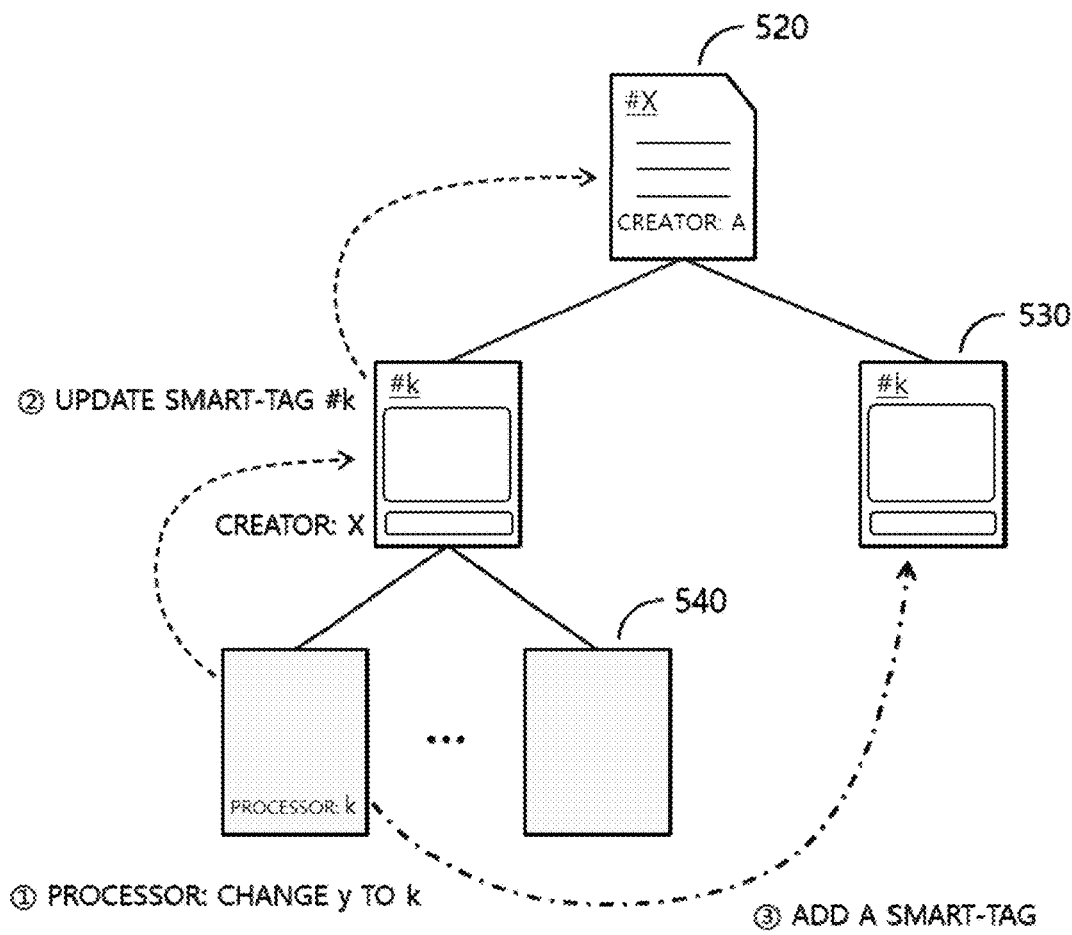

FIGS. 5 to 7 illustrate a smart-tag operating in the PDCA structure according to the present disclosure.

Referring to FIG. 5, the work processing device 130 may implement a work processing flow through a plurality of heterogeneous work units having a dependency relationship. In particular, among work units, a work project 510, a work note 520, a work chat room 530, and a work task 540 may comprise a PDCA work processing flow to provide efficient project management.

Specifically, within one work project 510, a plurality of work notes 520 may be recorded, and the work notes 520 may be created by work participants in the progress of the work project 510. The work processing device 130 may detect creation of a work note 520, generate a smart-tag 500a having attribute information (for example, a creator, creation time, and a state value) associated with the corresponding work note 520 as a tag name, and attach the generated smart-tag to the work project 510. The attached smart-tag 500a may be used to search for the work project 510 according to the attribute associated with the work note 520.

Meanwhile, the work processing device 130 may independently set a generation rule of a smart-tag 500 for each work project 510. FIG. 5 may correspond to an example in which the generation rule uses the name of a creator who creates a work unit as a tag name of the smart-tag 500. In other words, when a creator A creates a work note 520, the work processing device 130 may generate smart-tag 500a "#A" that uses the creator's name "A" as the tag name and attach the generated smart-tag to the work project 510.

Also, when a creator X creates a work chat room 530 for communication between work participants in association with the corresponding work note 520, the work processing device 130 may generate a smart-tag 500b "#X" that uses the creator's name "X" as the tag name and attach the generated smart-tag to the corresponding work note 520. As described above, when the creation of a work unit is detected, the work processing device 130 may identify the attribute information of the work unit according to a generation rule of a smart-tag 500 and automatically generate and attach the smart-tag 500.

On the other hand, the work chat room 530 may provide a function related to creating a work task 540 within a chat room. Work participants participating in the chat room may create a work task 540, if necessary, during a conversation and share the work task using dialog messages. At this time, a smart-tag 500c that uses the name of a creator who creates the work task 540 as a tag name may be generated and attached to the work chat room 530. As a result, work units may form a mutual dependency relationship between the work project 510 and the work note 520, between the work note 520 and the work chat room 530, and between the work chat room 530 and the work task 540.

Referring to FIG. 6, a plurality of work tasks 540 may be connected separately to the work chat room 530 through a smart-tag. In particular, a smart-tag may be generated based on a creator, creation time, and a state value from the attribute information of a work task 540, and each smart-tag may be attached to the work chat room 530. Accordingly, attached smart-tags may be visually displayed on a specific area of the work chat room 530.

In FIG. 6, a smart-tag 600*b* based not only on the creator y but also on the creation time z may be generated and attached to the work chat room 530. In other words, a smart-tag #y 600*a*, which uses unique information for identifying the creator y (for example, a name or an identification code) as a tag name, may be generated, and a smart-tag #z 600*b*, which uses identification information for identifying the creation time z as a tag name, may be generated.

At this time, the work task 540 associated with the creation time z may also exist in another work chat room 530, and the work tasks 540 created in association with the current work chat room 530 may be searched for the work tasks 540 corresponding to the creation time z selectively through the corresponding smart-tag #z 540.

On the other hand, when a work task 540 is created in the work chat room 530, a smart-tag 600*c* may be created based on a work deadline set in the corresponding work task 540 and attached to the work chat room 530. In this case, the work processing device 130 may generate a smart-tag 600*c* separately according to the state value of the work deadline and may update and display the smart-tag 600*c* according to the change in the state value.

For example, when the creation time of the work task 540 has a state value of imminent based on the work deadline (t) as shown in figure (a) or when the creation time of the work task 540 has a state value of overdue, the work processing device 130 may generate smart-tags 600*c* in different forms (for example, smart-tag having different shapes or colors). Also, when the state value is changed to overdue after the work processing device 130 generates the smart-tag 600*c* according to the state value of imminent, the work processing device 130 may display the smart-tag by updating the shape of the smart-tag according to the changed state value.

Accordingly, a work-related person may indirectly recognize work in the imminent or overdue state through the smart-tag 600*c* attached to the work chat room 530. Also, the work-related person may select the corresponding smart-tag and check a list of work chat rooms 530 to which the smart-tag is attached or a list of work tasks 540 connected to the smart-tag.

Referring to FIG. 7, the work processing device 130 may create a work unit of the first type through a work object and sequentially generate a work unit of the second type through the work unit of the first type. Through the operation above, the work processing device 130 may implement a work processing flow through a plurality of heterogeneous work units having a dependency relationship.

In particular, the work processing device 130 may identify attribute information of the work unit of the second type, automatically generate a smart-tag based on the attribute information, and combine the smart-tag into the work unit of the first type. In this case, the attribute information may include, but is not limited to, a creator, creation time, and a state value of the work unit and may include various pieces of identification information related to a work unit such as the type of the work unit or characteristics of a work project.

In FIG. 7, when a work processor of the work task 540 is changed from y to k, the work processing device 130 may detect the change of the work task 540 and update the extension of a smart-tag. First, the work processing device 130 may change the tag name of a smart-tag attached to the work chat room 530 from y to k according to the change of the work processor (namely, #k). Afterward, the work processing device 130 may perform a search based on the changed smart-tag, detect a new work chat room 530 that satisfies the search condition, and attaches a smart-tag #k to the corresponding work chat room 530, thereby processing an update operation related to the extension of a smart-tag. If the work chat room 530 is changed to not satisfy the search condition according to the update of a smart-tag, the previously attached smart-tag may be removed.

Figure 8:
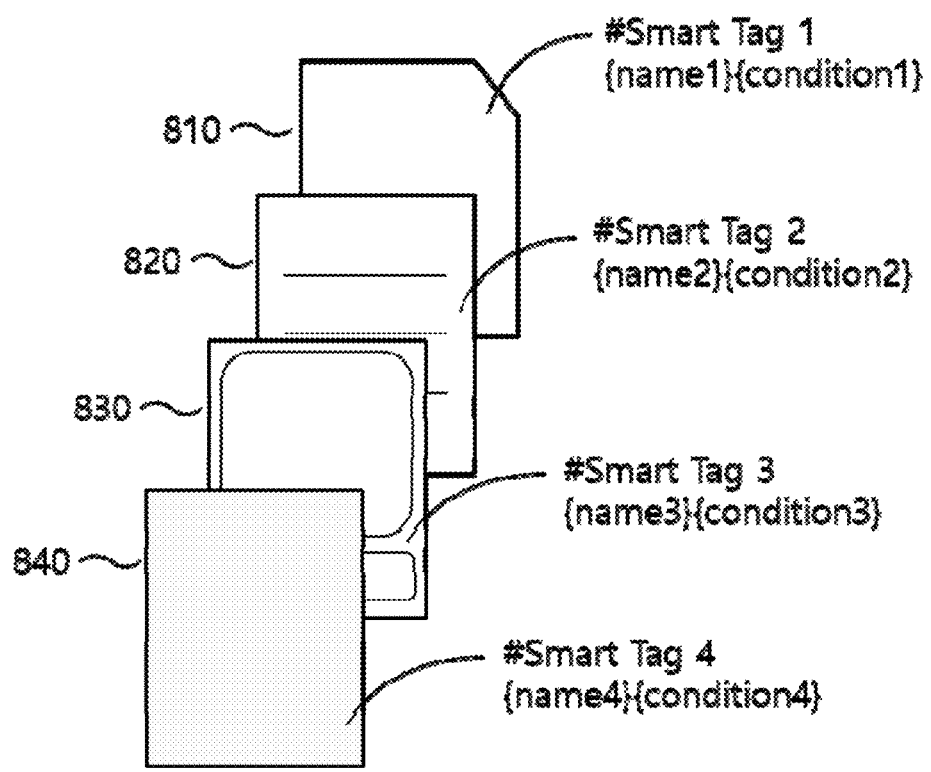
FIG. 8 illustrates a structure of a smart-tag according to the present disclosure.

FIG. 8 illustrates a structure of a smart-tag according to the present disclosure.

Referring to FIG. 8, the work processing device 130 may attach smart-tags to various user-defined works created according to the progress of a work project in a kanban board-based work processing process. At this time, the user-defined work may include a kanban card 810 defined on the Kanban board, a work note 820 defined on the kanban board or kanban card 810, a work chat room 830, and a work task 840.

More specifically, the entire project may be progressed step by step through the kanban board, and the entire project may include a plurality of work projects. The kanban card 810 defined on the kanban board may be created in response to each work project, and the work notes 820 and work tasks 840 created in the progress of the corresponding work project may be managed by being uploaded to the kanban card 810. Also, a work chat room 830 may be created and registered in the corresponding kanban card 810 for communication between work participants of the corresponding work project. The progress or state of the work project may be managed through work progress stages.

For example, when the work specifications are uploaded to the kanban card 810 by the work manager (Plan, P), the work progress stage of the corresponding kanban card 810 becomes "in progress." Also, when the work processor processes the work according to the work specifications and uploads the work processing results (Do, D), the work progress stage changes to "in review." At this time, work-related matters input by the work manager or the work processor may be recorded as a work note 820 and uploaded to the kanban card 810, each of which may change the card state of each kanban card 810. Also, work-related matters dependent on the work note 820 may be created as a work task 840 and managed in association with the work note 820.

Also, the work manager may check the work processing result of a work task 840 in the "in review" stage (Check, C) and terminate the corresponding work task 840. In this case, the work progress stage of the corresponding work task 840 may be "done." On the other hand, after checking the work processing result, the work manager may request work improvement for the work processing result. As described above, when the work manager uploads the work improvement request or work improvement instruction to the kanban card 810, the work progress stage of the corresponding kanban card 810 becomes "under improvement," and the card state of the corresponding kanban card 810 may also be changed.

When the work processor improves the work processing result according to the contents of the work improvement instruction (Act, A), and the work processor uploads the corresponding work improvement result to the kanban card 810 or the work manager checks the uploaded work improvement result, the work progress stage of the corresponding kanban card 810 may be set to "improvement done." And each of the kanban cards 810 may be sorted according to the work progress stage and arranged within the kanban board.

In FIG. 8, a smart-tag may be defined by including a tag name and a tag condition. At this time, the tag condition may correspond to a search condition related to the smart-tag. The work processing device 130 may provide an automatic attachment function to automatically attach tags to user-defined works that satisfy a search condition by setting the corresponding search condition while creating a smart-tag.

Accordingly, the burden of attaching a smart-tag for each user-defined work may be reduced, and smart-tags may be easily attached and detached only by changing a search condition. However, it should be noted that since it is also possible to attach the smart-tags one by one manually, a user may directly attach a smart-tag to the kanban card 810 that does not satisfy the search condition. Similarly, the user may manually remove a smart-tag from each kanban card 810 even after a search condition is set.

Also, the work processing device 130 may provide a call (or search) function for a smart-tag, and the user may call the smart-tag using a tag name or using both the tag name and a search condition. In one embodiment, assess rights may be set to a smart-tag for a call. Accordingly, only users who are granted access rights may execute search and inquiry functions using smart-tags limitedly.

Meanwhile, a smart-tag may be attached to each kanban card 810 managed on the kanban board. Also, the smart-tag may be attached to a work note 820, a work chat room 830, and a work task 840 managed on the kanban card 810. Accordingly, a compound search may be performed not only for the kanban card 810 but also for other tabs on the kanban board. For example, suppose a smart-tag #a showing a work note connected to work chat rooms that satisfy condition a is created in the work note tab (tab D in FIG. 9), and then the corresponding smart-tag is attached to another work note. When the #a tag is called in the work note tab, work notes connected to the work chat rooms searched from the condition a may be searched together with the work notes that use #a as a smart-tag.

Also, a smart-tag may add another smart-tag as a search condition. For example, while a work chat room tab (Tab C in FIG. 9) generates and use a smart-tag #abc to perform a search for work chat rooms, the work chat room tab may generate a smart-tag #xyz to be used for searching for work notes connected to the work chat room that satisfies the condition #abc. In other words, various types of combinations are possible as follows. ① plan tag=plan tag+plan search condition, ② check tag=plan tag+check search condition, and ③ plan tag=check tag+check search condition+act search condition.

Also, a smart-tag may be connected to the dashboard screen. The dashboard screen may display a statistical value for search results performed using smart-tags. For example, if there are multiple tabs as in the PDCA structure, and PLAN is called with a smart-tag, statistical values for DO, CHECK, and ACT associated with PLAN may also be displayed. Access rights to the dashboard screen may be restricted.

Figure 9:
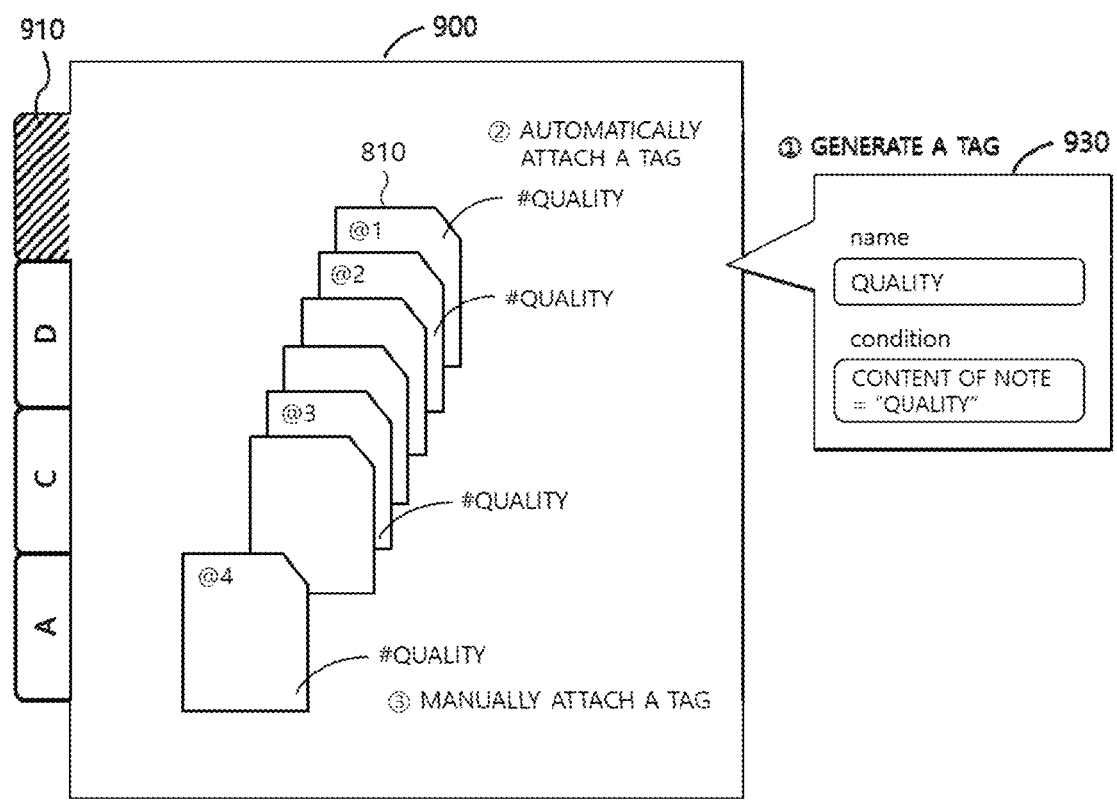
FIGS. 9 and 10 illustrate one embodiment of an attachment and search process for a smart-tag according to the present disclosure.
Figure 10:
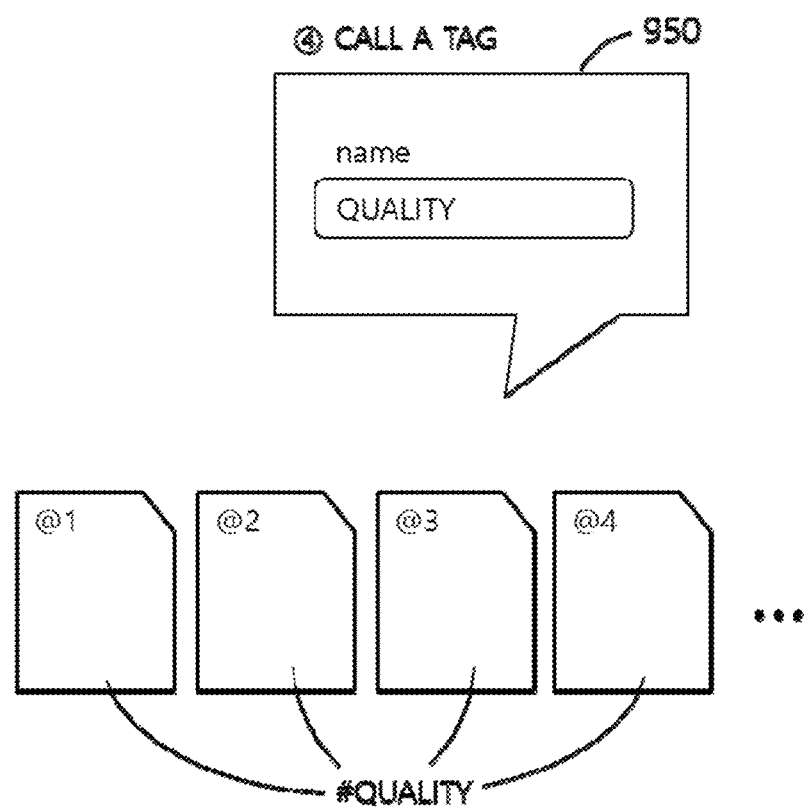

FIGS. 9 and 10 illustrate one embodiment of an attachment and search process for a smart-tag according to the present disclosure.

Referring to FIG. 9, the smart-tag may include a function of a general tag attached to each object, and a search condition may be set to the smart-tag so that the smart-tag is automatically attached to an object matching the search condition. In FIG. 9, P 910, D, C, and A tabs may be present in the kanban board 900. In the kanban card (P) area 910, a smart-tag called "quality" may be generated. At this time, an interface 930 capable of generating a smart-tag may be provided in the kanban card (P) area 910. If the note (D) content is set to "quality" on a configuration screen of the corresponding smart-tag, smart-tags (#quality) may be automatically attached to three kanban cards (@1, @2, and @3) connected to a work note including the content of quality. Also, a smart-tag may be individually attached to a separate kanban card (@4) like a general tag.

Referring to FIG. 10, the work processing device 130 may provide a call to a smart-tag (or a search for a smart-tag). In other words, a user may search for user-defined work connected to a smart-tag of which the tag name is "quality" through a separate search interface 950. Accordingly, a total of four Kanban cards (@1, @2, @, and @4) 810 may be displayed as a result of the call (or a search result). At this time, information on the four Kanban cards may be created and displayed in the form of a list, and the corresponding list may include a link that may be accessed through each Kanban card.

Meanwhile, the present disclosure describes various types of user-defined work (or work units) defined on the kanban board. However, the present disclosure is not necessarily limited thereto, and smart-tags may still be attached to and utilized in various forms of user-defined work. For example, the user-defined work may include a post on a blog, a message on an SNS, and a post on a web page.

The work processing device 130 according to the present disclosure may provide a smart-tag that provides an automatic attachment function on the PDCA structure. By designating a tag name and a tag condition to the smart-tag, tag attachment may be performed collectively, and various search results may be provided using the collective tag attachment. Also, the work processing device 130 may attach smart-tags easily to other items connected according to search conditions of the smart-tags when inter-connected items are created or modified as interconnectivity between work units is provided through the smart-tags within the PDCA structure.

Although exemplary embodiments of the present disclosure have been disclosed hereinabove, it may be understood by those skilled in the art that the present disclosure may be variously modified and altered without departing from the scope and spirit of the present disclosure described in the following claims.

| [Description of symbols] | |
| --- | --- |
| 100: Work processing system | |
| 110: User terminal | 130: Work processing device |
| 500: Smart-tag | |
| 510: Work project | 520, 820: Work note |
| 530, 830: Work chat room | 540, 840: Work task |
| 810: Kanban card | |
| 900: Kanban board | 910: Kanban card area |
| 930, 950: Interface | |

What is claimed is:

1. A smart-tag based work processing device, the device comprising:
   a work object processing unit creating a work object that implements a work processing flow through a plurality of heterogeneous work units having a dependency relationship;
   a work processing flow controller creating a work unit of a first type through the work object and sequentially creating a work unit of a second type through the work unit of the first type, wherein the work unit of the first type and the work unit of the second type have the dependency relationship to each other; and a smart-tag processing unit identifying a creator's attribute information of the work unit of the second type when the corresponding work unit is created, automatically generating a smart-tag based on the creator's attribute information of the work unit of the second type, and attaching the generated smart-tag from the work unit of the second type to the work unit of the first type.

2. The device of claim 1, wherein the work object processing unit implements a Plan Do Check Act (PDCA) work processing flow using work projects, work notes, work chat rooms, and work tasks.

3. The device of claim 1, wherein the work processing flow controller controls the dependency relationship by including the work unit of the second type in the work unit of the first type.

4. The device of claim 1, wherein the smart-tag processing unit determines, as the creator's attribute information, at least one combination of a creator's information, a creation time, and a state value related to the corresponding work unit; and the type of the corresponding work unit.

5. The device of claim 4, wherein the smart-tag processing unit generates the smart-tag based on the identification code of a work organization to which the creator belongs.

6. The device of claim 4, wherein, when generating the smart-tag based on the creation time, the smart-tag processing unit updates and displays the smart-tag according to the elapsed time from the creation time.

7. The device of claim 4, wherein the smart-tag processing unit generates the smart-tag separately according to the state value and updates and displays the smart-tag according to the state value change.

8. The device of claim 7, wherein the smart-tag processing unit determines a work progress stage change or a work deadline change as the state value change when the corresponding work unit is a work task.

9. The device of claim 8, wherein the smart-tag processing unit generates the smart-tag separately according to whether the corresponding work unit is a reminder and updates and displays the smart-tag according to the state value change.

10. A smart-tag based work processing device, the device comprising:

a work object processing unit creating a work object that implements a work processing flow through a plurality of heterogeneous work units having a dependency relationship;

a work processing flow controller creating a work unit of a first type through the work object and sequentially creating a work unit of a second type through the work unit of the first type; and a smart-tag processing unit identifying attribute information of the work unit of the second type when the corresponding work unit is created, automatically generating a smart-tag based on the attribute information, and combining the smart-tag into the work unit of the first type, wherein the smart-tag processing unit extends the smart-tag by setting a search condition and searching for the work unit of the second type, wherein the smart-tag processing unit updates the extension of the smart-tag by detecting a change in the work unit of the second type.

11. The device of claim 10, wherein the smart-tag processing unit configures the search condition using a search keyword and a search operator and sets user's access rights to an extension part of the smart-tag.

12. The device of claim 11, wherein, when the user's access rights are set in the extension part of the smart-tag, the smart-tag processing unit hides the corresponding tag name of the work unit of the first type from a user without the access rights.

13. The device of claim 10, wherein the smart-tag processing unit includes other smart-tags that do not establish a mutual inclusion relationship in the smart-tag.

14. The device of claim 10, wherein, when a search through the smart-tag is performed, the smart-tag processing unit detects a change in the work unit of the second type and notifies of the change through a smart-tag in the work unit of the first type.

15. The device of claim 14, wherein, when a search through the smart-tag is performed, the smart-tag processing unit detects a change in the work unit of the second type and highlights and displays the corresponding smart-tag in the work unit of the first type.

16. A smart-tag based work processing method, the method comprising:

processing a work object creating a work object that implements a work processing flow through a plurality of heterogeneous work units having a dependency relationship;

controlling a work processing flow creating a work unit of a first type through the work object and sequentially creating a work unit of a second type through the work unit of the first type, wherein the work unit of the first type and the work unit of the second type have the dependency relationship to each other; and processing a smart-tag identifying a creator's attribute information of the work unit of the second type when the corresponding work unit is created, automatically generating a smart-tag based on the creator's attribute information of the work unit of the second type, and attaching the generated smart-tag from the work unit of the second type to the work unit of the first type.

* * * * *